US009651969B2

(12) United States Patent
Coutts et al.

(10) Patent No.: US 9,651,969 B2
(45) Date of Patent: May 16, 2017

(54) ADAPTIVE VOLTAGE SCALING USING ANALYTICAL MODELS FOR INTERCONNECT DELAY

(71) Applicant: QUALCOMM Incorporated, San Diego, CA (US)

(72) Inventors: Ryan Michael Coutts, Carlsbad, CA (US); Paul Ivan Penzes, San Diego, CA (US); Shih-Hsin Jason Hu, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 27 days.

(21) Appl. No.: 14/814,112

(22) Filed: Jul. 30, 2015

(65) Prior Publication Data

US 2017/0031376 A1  Feb. 2, 2017

(51) Int. Cl.
| | | |
|---|---|---|
| *H01L 35/00* | (2006.01) |
| *H01L 37/00* | (2006.01) |
| *H03K 3/42* | (2006.01) |
| *H03K 17/78* | (2006.01) |
| *G05F 1/625* | (2006.01) |
| *G06F 1/32* | (2006.01) |

(52) U.S. Cl.
CPC .............. *G05F 1/625* (2013.01); *G06F 1/324* (2013.01); *G06F 1/3206* (2013.01); *G06F 1/3296* (2013.01)

(58) Field of Classification Search
CPC ....................................................... G05F 1/625
USPC ................................................. 327/512–513
See application file for complete search history.

(56) References Cited

U.S. PATENT DOCUMENTS

| | | | |
|---|---|---|---|
| 7,337,335 B2 | 2/2008 | Jorgenson et al. | |
| 7,714,635 B2 | 5/2010 | Singh et al. | |
| 8,547,164 B2 | 10/2013 | Flores et al. | |
| 2007/0096775 A1 | 5/2007 | Elgebaly et al. | |
| 2008/0120065 A1* | 5/2008 | Joshi ................ G01R 31/31727 | |
| | | | 702/182 |
| 2010/0289553 A1 | 11/2010 | Wang | |
| 2012/0075005 A1* | 3/2012 | Flores ................ H03K 19/0016 | |
| | | | 327/512 |
| 2013/0311799 A1 | 11/2013 | Fitzpatrick et al. | |
| 2014/0028377 A1* | 1/2014 | Rosik ........................ G05F 3/02 | |
| | | | 327/513 |
| 2015/0008987 A1 | 1/2015 | Bollapalli et al. | |
| 2015/0278427 A1* | 10/2015 | Yang ................... G06F 17/5081 | |
| | | | 716/136 |

OTHER PUBLICATIONS

International Search Report and Written Opinion—PCT/US2016/040523—ISA/EPO—Oct. 31, 2016.

* cited by examiner

*Primary Examiner* — Lincoln Donovan
*Assistant Examiner* — Metasebia Retebo
(74) *Attorney, Agent, or Firm* — Chui-kiu Teresa Wong; Kenneth Vu

(57) ABSTRACT

A method of setting a supply voltage in a device is disclosed. The method includes receiving a first plurality of inputs from a plurality of sensors that are representative of a gate delay of a signal path on the device, and receiving a second plurality of inputs from a plurality of temperature sensors. The method further includes estimating a plurality of interconnect delays for the signal path based on the second plurality of inputs, and determining the supply voltage for the signal path based on the first plurality of inputs and the plurality of interconnect delays.

20 Claims, 6 Drawing Sheets

ADAPTIVE VOLTAGE SCALING USING ANALYTICAL MODELS FOR INTERCONNECT DELAY

TECHNICAL FIELD

This application relates to adapting a supply voltage of a die according to operating conditions, and more particularly, to adapting a supply voltage to account for various components of signal path delay in a processing unit.

BACKGROUND

A chip or die may include multiple different regions or areas of circuitry with each of the different areas devoted to different functions. In an embodiment, different areas of circuitry may be referred to as processing units (PUs). For example, in a smartphone or other wireless communication device, a PU may be a wireless baseband modem, a graphics processing unit (GPU), an image processing unit, a core in a multi-core processor, or other type of processing circuitry.

The clock frequency applied to a PU depends on a supply voltage applied to the PU. Throughput and other performance measures of a PU depend on clock frequency. By increasing voltage, higher frequencies may be accommodated, and by decreasing voltage, higher frequency performance may be affected. Thus, adjusting supply voltage is a way to adjust frequency characteristics and thereby the performance of a PU.

Frequency of operation of various PUs on a chip is varied depending on the operating needs of the PUs. For example, watching a movie on a smartphone may demand higher performance of cores on a multi-core processor than when the smartphone is idle and waiting to receive a call. It is therefore useful to incorporate an approximation of the relationship between supply voltage and frequency of operation into determination of the operating point of PUs.

The relationship between supply voltage and frequency of operation may be affected by process variation among different areas of a die. For example, at the time of manufacture of a chip, process variation in manufacturing the transistors in different areas of a chip can result in both chip-to-chip variation in this relationship (inter-chip variation), as well as variation in characteristics of transistors between different areas of a chip (intra-chip variation).

Conventional techniques for ascertaining a relationship between voltage and frequency can include sensors placed on a chip. The sensors provide information about the performance of the region of circuitry in which the sensor resides. For example, the sensors may be designed to capture information about the performance of transistors in circuitry that forms a signal path. The term "critical path" is sometimes used to refer to a signal path having a signal delay that is longer than most or all of the other signal paths of interest on a die or a portion of a die for a set of operating conditions (such as supply voltage and temperature). Thus, setting supply voltage to provide sufficient performance for a critical path can provide some assurance that other signal paths on the same die or same region of the die are operating sufficiently.

An example sensor is a ring oscillator (RO). An example RO comprises a feedback ring having an odd number of inverters with a counter attached to the ring. A RO can be used to generate a clock signal, and the counter can be used to determine process variation effects on frequency characteristics. For example, inverters in a RO may have similar process characteristics as the logic components on a nearby area on the chip, so the RO frequency at a given supply voltage is an indication of performance (e.g., signal delay) of signal paths nearby. Operating frequency of a PU depends on one or more signal delays within the PU, so signal delay provides an indication of the operating frequency of a PU. Higher signal delay indicates lower operating frequency and lower signal delay indicates higher operating frequency.

Conventional sensors account for scenarios in which performance of a signal path is limited primarily by transistor performance. These signal paths are sometimes referred to as gate dominated paths. Some conventional sensors thus take into account characteristics of a first portion of integrated circuit (IC) fabrication where individual devices are patterned in a semiconductor. This first portion of IC fabrication is sometimes referred to the front-end-of-line (FEOL).

However, other factors that affect performance of a signal path are characteristics of wires and vias on the path. Some paths, for example, may include longer wire paths than others, and the paths with longer wires can be affected primarily by wire (and/or via) characteristics, whereas paths with shorter wires can be affected primarily by transistor characteristics. Delays due to transistor characteristics are sometimes referred to as gate delays, and delays due to wire or via characteristics are sometimes referred to as interconnect delays. Paths that are affected primarily by interconnect delays are sometimes referred to as wire dominated paths. In some embodiments, performance of cores in a multi-core processor is affected more by gate dominated paths, and performance of connections between memories and cores is affected more by wire dominated paths. A second portion of IC fabrication adds interconnection among individual devices on a chip, including contacts, interconnect wires, and vias as examples. This second portion of IC fabrication is sometimes referred to as the back-end-of-line (BEOL).

A BEOL sensor can be configured to account for BEOL characteristics. However, BEOL sensors can be quite large, thus sometimes requiring valuable chip area and also making placement of one or more BEOL sensors near a signal path of interest inconvenient in some embodiments. There is thus a need to account for interconnect delay in estimating path delay while employing as few BEOL sensors as feasible.

SUMMARY

Methods of setting a supply voltage in a device are disclosed. In one embodiment, a method includes receiving a first plurality of inputs from a plurality of sensors that are representative of a gate delay of a signal path on the device, and receiving a second plurality of inputs from a plurality of temperature sensors. The method further includes estimating a plurality of interconnect delays for the signal path based on the second plurality of inputs, and determining the supply voltage for the signal path based on the first plurality of inputs and the plurality of interconnect delays.

Various systems on chips (SoC) are disclosed. In one embodiment, an SoC includes a processing unit configured to receive inputs from a plurality of front-end-of-line (FEOL) sensors and a plurality of temperature sensors distributed about the SoC, and receive a plurality of temperature sensor inputs. The processing unit is further configured to determine at least one back-end-of-line (BEOL) characteristic from the temperature sensor inputs, and determine a supply voltage for a signal path on the SoC to achieve an operating frequency, wherein the supply voltage is based on the inputs from the FEOL sensors and the at least one BEOL characteristic.

In another embodiment, an SoC having a signal path is disclosed. The SoC includes means for receiving at least one input from a sensor that indicates a gate delay of the signal path, and means for estimating at least one interconnect delay of the signal path based on at least one temperature measurement. The SoC further includes means for determining a supply voltage for the signal path based on the first plurality of inputs and the at least one interconnect delay.

In yet another embodiment a device is disclosed. The device includes at least one delay sensor that provides an indication of path delay due to logic circuit characteristics of the device, at least one temperature sensor, and a processing unit. The processing unit is configured to receive inputs from the at least one delay sensor and the at least one temperature sensor, determine at least one resistance based on the inputs from the at least one temperature sensor, and determine at least one interconnect delay based on the at least one resistance. The processing unit is further configured to determine a supply voltage for a signal path on the device based on the at least one interconnect delay and the inputs from the at least one delay sensor.

DETAILED DESCRIPTION

Exemplary embodiments may employ a variety of sensors that provide inputs to provide predictions of maximum operating frequency of a signal path. Predicted maximum operating frequency can be used to set supply voltage of components in the signal path according to a model of maximum frequency that is a function of supply voltage. Embodiments include various combinations of BEOL sensors, FEOL sensors, temperature sensors, and voltage sensors for providing inputs to predict maximum operating frequency. Temperature and FEOL sensors may be distributed uniformly over a die, including within, between and/or around PUs. In some embodiments, BEOL sensors are placed next to PUs on a die, instead of within PUs, due to the size of BEOL sensors. In some embodiments, BEOL sensors are used during testing to characterize characteristics for one or more temperatures, and the sensors may not be needed again during operation to set the operating voltage. At least one BEOL sensor may be configurable to select particular wires or vias of a die to determine corresponding characteristics.

Figure 1:
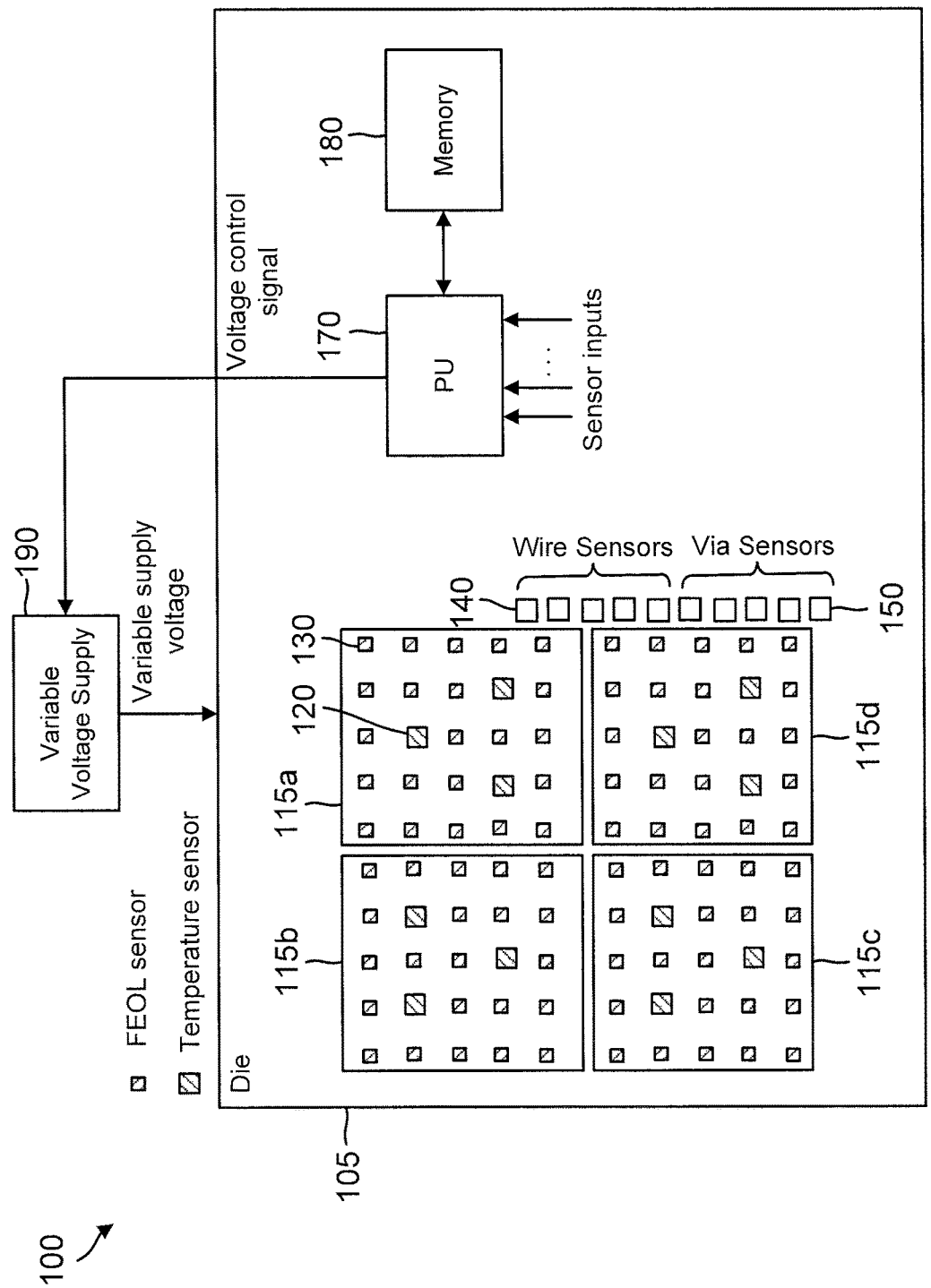
FIG. 1 illustrates an example system for adapting supply voltage in accordance with an embodiment of the disclosure.

FIG. 1 illustrates an embodiment of a system 100 that includes a die 105 including a plurality of processing units (PUs) 115a-115d. The system 100 also includes variable voltage supply 190. As an example, the die 105 may represent a system on chip (SoC) included in a wireless communication device, such as a tablet or smartphone. In some embodiments, an SoC refers to multiple PUs embedded on a single die. At least one of the PUs may include one or more FEOL sensors or temperature sensors embedded within the PU. A representative temperature sensor in PU 115a is indicated as 120, and a representative FEOL sensor is indicated as 130. The PUs 115a-115d may each represent a core in a quad-core central processing unit (CPU) as an example.

BEOL sensors are illustrated as wire sensors and via sensors. A representative wire sensor is labeled as 140, and a representative via sensor is illustrated as 150. BEOL sensors can be quite large, thus making placement of one or more BEOL sensors near a critical path inconvenient in some embodiments. Also, intra-die BEOL process variation is typically small relative to intra-die FEOL variation on a chip, so BEOL characteristics are less sensitive to location on a chip. Thus, in some embodiments the wire sensors and via sensors can provide measurements of BEOL characteristics for a critical path regardless of the location of the critical path on the die.

The die 105 also includes a PU 170 and a memory 180. The PU 170 is configured to receive as inputs, signals from one or more of the temperature sensors 120, FEOL sensors 130, wire sensors 140, and via sensors 150. The PU 170 is configured to communicate with memory to retrieve stored instructions or other data and configured to use the instructions and/or data to compute a supply voltage for a signal path on the die 105. The signal path may be a critical path in a PU or any other path that provides an indication of the performance of a PU. In some embodiments, the supply voltage is selected so that the signal path, and therefore the PU, can reliably operate at the desired frequency. FIG. 1 illustrates a PU 170 dedicated to determining supply voltage. As an alternative, one of the PU's 115a-115d (e.g., a core in a multicore processor) may be employed to determine supply voltage.

The voltage or power supply 190 may be any type of power supply able to generate a variable supply voltage. For example, the power supply 190 may be a switched mode power supply or a power management integrated circuit. Although the power supply 190 is illustrated as residing off the die 105, all or part of the power supply may be located on the die 190. In some embodiments, the variable voltage supply supplies power to each of the PUs 115, which includes the signal path of interest.

The memory 180 may be any electronic component capable of storing information and/or instructions. For example, the memory 180 may include random access memory (RAM), read-only memory (ROM), flash memory devices in RAM, optical storage media, erasable programmable read-only memory (EPROM), registers, or combinations thereof. In an embodiment, the memory 180 is a non-transitory computer-readable medium. Instructions or code may be stored in the memory 180 that are executable by a PU, such as PU 170 or PU 115a, to implement the methods disclosed herein. The terms "instructions" and "code" should be interpreted broadly to include any type of computer-readable statement(s). For example, the terms "instructions" and "code" may refer to one or more programs, routines, sub-routines, functions, procedures, etc.

"Instructions" and "code" may include a single computer-readable statement or many computer-readable statements.

Figure 2:
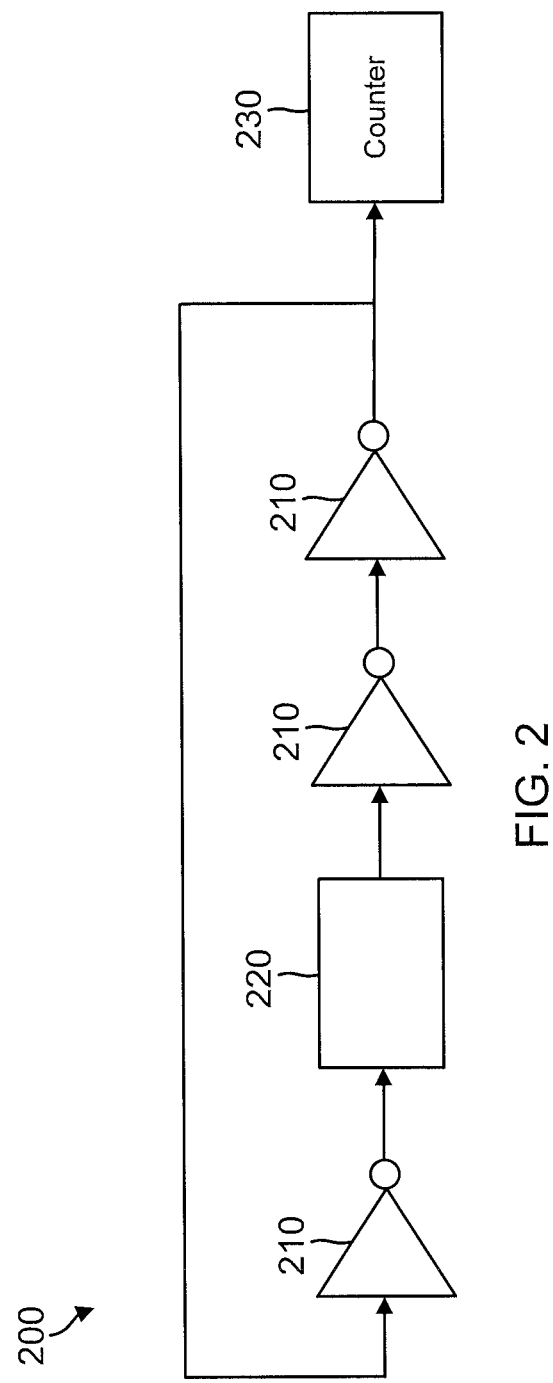
FIG. 2 illustrates an example embodiment of a BEOL sensor in accordance with an embodiment of the disclosure.

FIG. 2 illustrates an embodiment of a BEOL sensor 200. The BEOL sensor 200 is an example embodiment of a wire sensor 140 or a via sensor 150, depending on the configuration of block 220. The BEOL sensor 200 is configured as a RO that includes three inverters 210 connected in series as shown. Three inverters is used for illustrative purposes, but the BEOL sensor 200 may include any odd number of inverters, such as five, seven, etc., configured as a RO. A counter 230 is used to count a number of signal transitions (from logic low to high or high to low) and a frequency of transitions can be computed in a straightforward manner therefrom. Block 220 includes one or more vias or wires on the die 105. For example, if a frequency characteristic of a particular wire on a metal layer in the die 105 is desired, the block 220 may include a wire on the metal layer of interest. As another example, if a frequency characteristic of a particular via between certain metal layers in the die 105 is desired, the block 220 may include a via between the metal layers of interest. As further example, if a statistical extreme or "corner" is desired for wires on the die 105, the block may include a plurality of wires on different metal layers connected in series. Likewise, if a statistical extreme or "corner" is desired for vias on the die 105, the block may include a plurality of vias connected in series.

Characteristics of different wires can be measured using different wire sensors 140. Furthermore, a number of wire sensors 140 can be selected to match a number of characteristics to be measured. For example, if the die 105 has five metal layers, five wire sensors 140 can be used, each of which has block 220 configured to correspond to a wire on a metal layer. That is, block 220 in a first wire sensor 140 may include a wire on metal layer one, block 220 in a second wire sensor 140 may include a wire on metal layer two, and so on. Similarly, block 220 in a first via sensor 150 may include a via between a first pair of metal layers, block 220 in a second via sensor 150 may include a via between a second pair of metal layers, and so on. Alternatively, block 220 in at least one of the via sensors 150 may include a plurality of vias.

Figure 3:
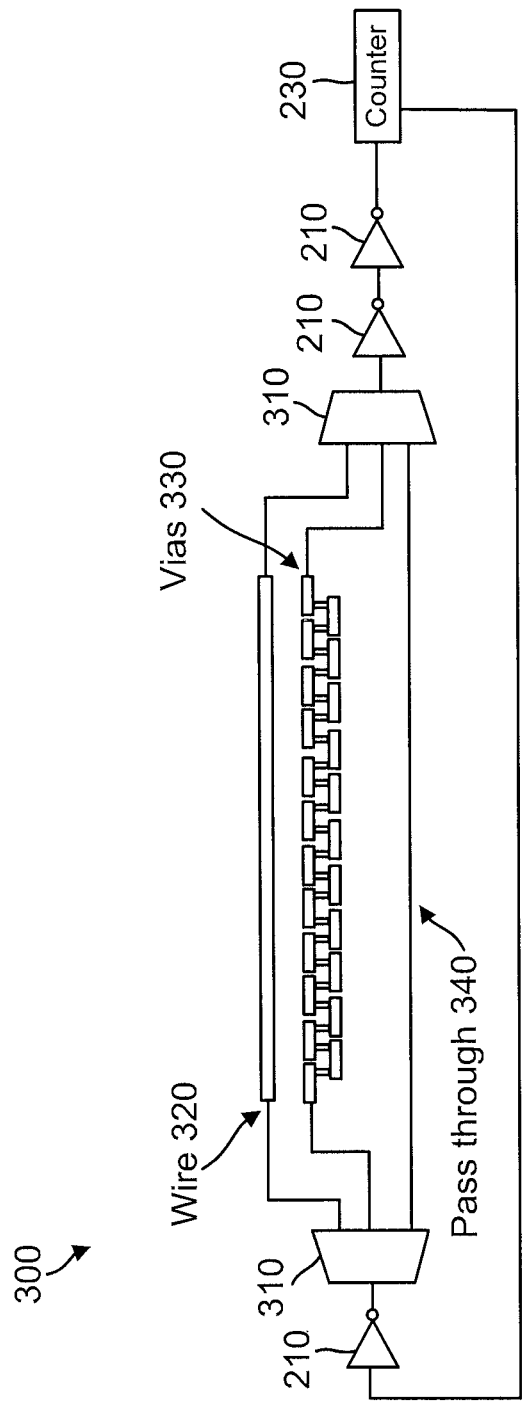
FIG. 3 illustrates a configurable sensor that can be used to measure FEOL or BEOL characteristics in accordance with an embodiment of the disclosure.

FIG. 3 illustrates a configurable sensor 300 that can be used to measure FEOL or BEOL characteristics. In some embodiments, a configurable sensor is used to measure wire and via characteristics. The sensor 300 is a RO that includes multiplexers 310 configured to select one of three paths. Thus, one of three paths is selected: (1) a long wire 320; (2) a plurality of vias 330 connected in series; and (3) a pass through path 340. Configuring multiplexers 310 to select the wire 320 results in a count (performed by counter 230) that provides information on wire characteristics of the chip on which the BEOL sensor is placed. In some embodiments, the wire 320 is a wire that spans one or more metal layers on the die 105 and therefore also includes some vias. Configuring multiplexers 310 to select the series of vias results in a count (performed by counter 230) that provides information on via characteristics of the chip. In some embodiments, the vias 330 may include a number of vias that represents a worst-case or statistical extreme or statistical "corner" any given path on the die 105 may experience. Further, the pass through path 340 represents a short section of wire (FIG. 3 is not drawn to scale). Configuring multiplexers 310 to select the pass through 340 results in a count (performed by counter 230) that provides information on FEOL characteristics because the delay of this path is dominated by the gate delays of inverters 210 and is thus a gate-dominated signal path. Other embodiments may include more than three choices of paths.

Example embodiments of wire sensors 140 or via sensors 150 can include the sensor 300 configured accordingly. The sensor 300 may serve as a wire sensor 140 if the multiplexers 310 are configured to select wire path 320, and the sensor 300 may serve as a via sensor 150 if the multiplexers 310 are configured to select vias 330.

In some embodiments, one or more BEOL sensors are used during testing to provide information for an analytical model of wire delay. The analytical model of wire delay is a function of temperature and may be used during chip operation to provide inputs to the analytical model of signal path delay. One such model for BEOL characteristics begins with a model for resistance, and wire delay may be calculated in a straightforward manner from resistance. Using a determined resistance and a measured interconnect delay, a relationship between resistance and interconnect delay can be ascertained in a straightforward manner that can be used to map resistance to delay.

An example analytical model for resistance is provided as $$R(T)=R_0(1+R_{t_1}(T-25)+R_{t_2}(T-25)^2), \tag{1}$$

where R is resistance, $R_0$, $R_{t_1}$ and $R_{t_2}$ are constants, and T is temperature in Celsius. The constants $R_{t_1}$ and $R_{t_2}$ are typically provided by the chip manufacturer of the chip of interest. The constant $R_0$ if affected by process variation during manufacture, so $R_0$ may vary from chip to chip. The constant $R_0$ can be determined while testing a chip, as explained with respect to FIG. 4.

Figure 4:
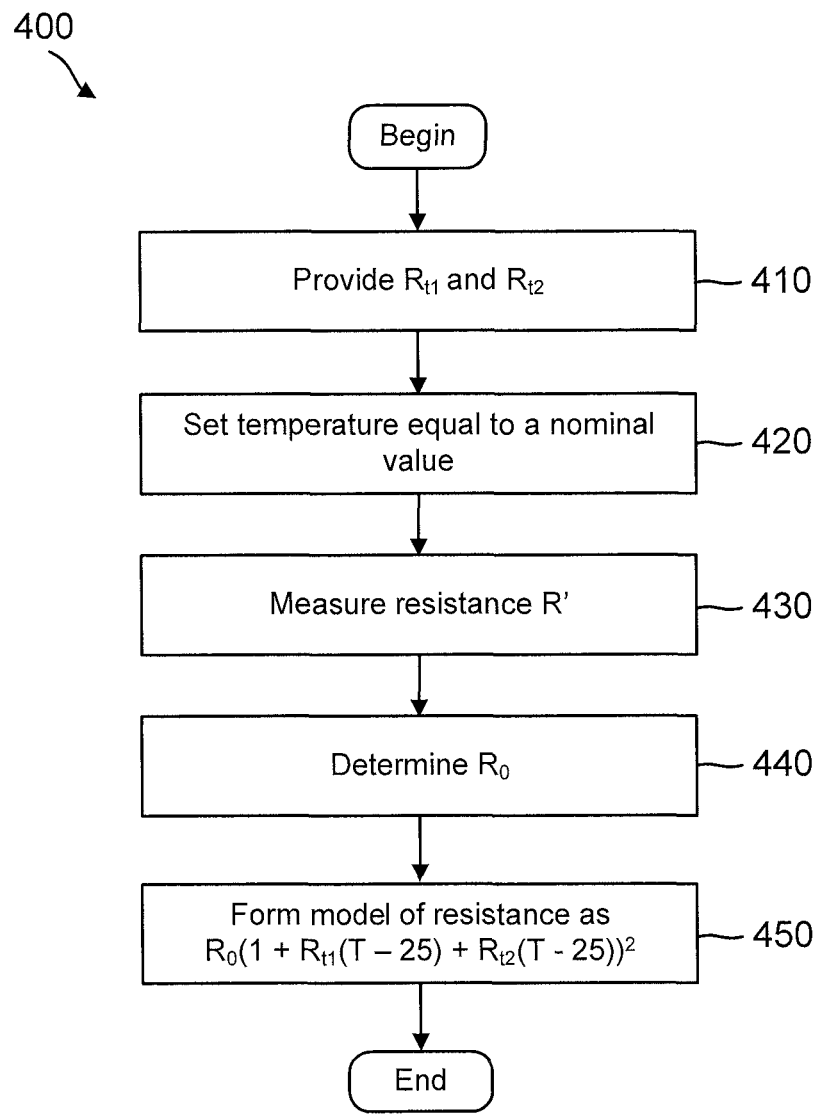
FIG. 4 illustrates a flowchart of an example method for performing testing of a die in accordance with an embodiment of the disclosure.

FIG. 4 illustrates a flowchart of an example method 400 for performing testing of a die, such as die 105, to determine constants to be used in an analytical model of resistance, such as the model in equation (1), for a particular signal path on the die. The method 400 may be performed by, for example, placing the die in a thermally controlled environment and attaching testing equipment to the die to perform measurements at a set temperature as explained below.

The particular signal path may, for example, include any combination of wire segments on metal layers in a chip and vias between metal layers, or the metal path may include only one wire segment or only one via. In some embodiments, a configurable sensor 300 may be used to measure wire or via characteristics by selecting the wire 320 or vias 330. The method 400 may be performed while running controlled tests on a die and prior to use of the die. For example, if the die is to be included in a smartphone, testing of the die may occur before implementing the chip in the smartphone.

The example method begins in block 410 in which the constants $R_{t_1}$ and $R_{t_2}$ are provided. These constants may be provided by a die manufacturer for the die of interest and stored in a memory, such as memory 180. Next in block 420 the temperature of a die is set equal to a fixed nominal value, such as 10° Celsius (C), 15° C., or 25° C. The temperature of a die can be controlled or set during a test phase in a variety of ways. For example, the die may be placed in a chamber that is a controlled environment set to a desired temperature. Next in block 430, the resistance of a signal path R' is measured. One way to determine resistance is to measure voltage drop and current in the signal path and use Ohm's Law to estimate resistance as measured voltage divided by measured current.

Once resistance R' is determined, the method proceeds to block 440. In block 440, $R_0$ is determined. In some embodiments, equation (1) is used to solve for $R_0$, because all values in equation (1) are known except for $R_0$. A straightforward way to determine $R_0$ is to measure resistance at a temperature T of 25° C., and the measured resistance value is equal to $R_0$. In block 450, a model of resistance for the circuit portion of interest is formed as $R(T)=R_0(1+R_{t_1}(T-25)+R_{t_2}(T-25)^2$, where $R_0$, $R_{t_1}$ and $R_{t_2}$ are all now known values. The constants for the analytical model may be stored in memory, such as memory 180. The formula for the analytical model may be stored as instructions in a memory to be executed on a processor, such as processor 170.

The frequency characteristics of a signal path on a die, such as the die 105 in FIG. 1, can be modeled analytically. An example analytical model is shown in equation (2) below:

$$F_{path\ k}(v,T)=(\hat{A}(T)\cdot\hat{P}(v,T)+\hat{B}(T)\cdot\hat{W}(v,T)) \qquad (2)$$

where $F_{path\ k}(v,T)$ is a maximum operating frequency for a given signal path (denoted as path k) at a supply voltage v and temperature T, $\hat{P}(v,T)$ is a vector of FEOL measurements from FEOL sensors, $\hat{W}(v,T)$ is a vector of BEOL characteristics obtained by measurement or calculation, $\hat{A}$ and $\hat{B}$ are vectors that relate BEOL and FEOL characteristics to maximum operating frequency, and the notation "X·Y" denotes the dot product of vectors X and Y. A vector may include more than one element, so a vector may be viewed as a collection of elements or numeric values. Once $\hat{A}$ and $\hat{B}$ are determined at different temperatures, the maximum operating frequency F can be calculated using BEOL and FEOL characteristics. Example FEOL characteristics are various types of gate delays, such as delays through various types of transistor logic devices, and example BEOL characteristics are various types of wire or interconnect delays, such as signal delays through a wire in a metal layer or a via between metal layers in a chip. A weighted sum of various gate delays and wire delays provides an estimate of signal delay in a path of interest.

The analytical model in equation (2) for operating frequency for a path is used to determine maximum operating frequency as a weighted sum of FEOL measurements and BEOL characteristics. The maximum operating frequency is a weighted sum of the elements in vectors $\hat{P}(v,T)$ and $\hat{W}(v,T)$, where the weights are provided as the elements in vectors $\hat{A}(T)$ and $\hat{B}(T)$, respectively. The model is flexible enough to account for a variety of factors that impact path delay. For example, FEOL sensor outputs located further from a signal path of interest may be weighted less than FEOL sensor outputs located closer to the path of interest. As another example, BEOL characteristics may be weighted more heavily for a signal path that is wire dominated, whereas FEOL characteristics may be weighted more heavily for a signal path that is gate dominated. Furthermore, signal path characteristics may change with temperature, and the model accounts for those changes.

The model expressed by equation (2) is one example that uses FEOL and BEOL measurements or characteristics to characterize a signal path of interest. Other models are within the scope of this disclosure. For example, second order models that are further based on weighted pairwise products between elements of $\hat{P}(v,T)$ and $\hat{W}(v,T)$ are within the scope of the disclosure.

Figure 5:
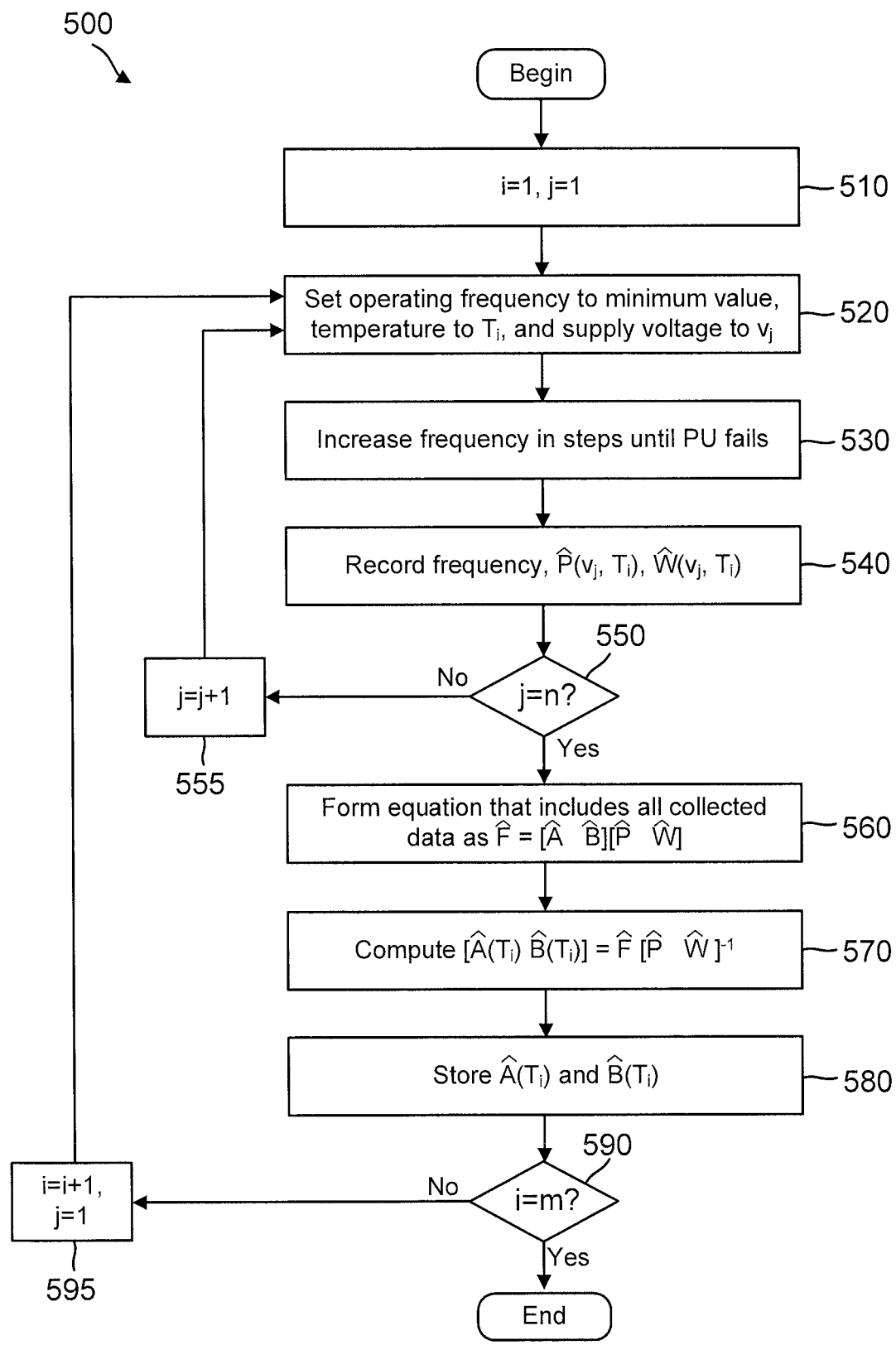
FIG. 5 illustrates a flowchart of an example method for performing testing of a die to determine values to be used in an analytical model of frequency in accordance with an embodiment of the disclosure.

FIG. 5 illustrates a flowchart of an example method 500 for performing testing of a die, such as die 105, to determine values to be used in an analytical model of frequency, such as the model in equation (2), for a particular path on the die. The path may include various logic components and interconnects between the components such that path delay is influenced by a combination of gate delays and interconnect delays. The method 500 may be performed while running controlled tests on a die and prior to use of the die. For example, if the die is to be included in a smartphone, testing of the die may occur before implementing the chip in the smartphone. The method 500 may be performed by, for example, placing the die in a thermally controlled environment and attaching testing equipment to the die to perform measurements at a set temperature as explained below.

The example method begins in block 510 in which the method is initialized with starting values of indexes i and j, which correspond to a temperature index and a voltage index, respectively. The indexes i and j are incremented (and thus temperature and voltage set points are incremented) as steps of a control loop are completed. Next in block 520, an operating frequency of a PU on a die, such as PU 115a is set to a minimum value, and a temperature of the die and supply voltage supplied to a PU are set to $T_i$ and $v_j$, respectively. In some embodiments, a PU that includes a signal path of interest is selected as the PU to test. Next in block 530, the operating frequency is increased in fixed increments until the PU fails. In some circumstances, failure of a PU means that signals in the PU do not propagate quickly enough to keep up with the operating frequency, and as a result data processed by the PU is corrupted. At the point at which the PU fails, operating frequency is recorded as the maximum operating frequency for the temperature and voltage $T_i$ and $v_j$, respectively. The vector $\hat{P}(v_j,T_i)$ is also recorded. The vector $\hat{W}(v_j,T_i)$ may be measured using BEOL sensors. However, in some embodiments, $\hat{W}(v_j,T_i)$ is computed based on temperature by first computing one or more resistances using an analytical model, such as equation (1), and next computing interconnect path delays using the resistances.

Next in block 550, the voltage index j is compared to n, where n is an integer that represents the number of voltages used in testing. In some embodiments, voltages $v_1, v_2, \ldots, v_n$ span the expected operating range of voltage supplies by a voltage supply, such as voltage supply 190. If j is equal to n, then the method moves to block 560. If j is not equal to n, then j is incremented in 555, and the method proceeds to block 520. In block 520, in addition to resetting the operating frequency to a minimum value and temperature to $T_i$, the supply voltage is set to new voltage $v_j$ and blocks 530, 540 and 550 are repeated. Eventually j will equal n and the method will proceed to block 560. In block 560, an equation is formed that includes all collected data as $\hat{F}=[\hat{A}\ \hat{B}][\hat{P}\ \hat{W}]$, where $\hat{F}$ is a vector whose elements are all the maximum operating frequencies recorded in block 540 and $[\hat{P}\ \hat{W}]$ is a matrix of the values of $\hat{P}(v_j,T_i)$ and $\hat{W}(v_j,T_i)$ for all j recorded in block 540. The vectors $\hat{A}$ and $\hat{B}$ are unknowns and need to be determined for temperature $T_i$. These vectors are computed in block 570 as $[\hat{A}(T_i)\ \hat{B}(T_i)]=\hat{F}[\hat{P}\ \hat{W}]^{-1}$, where these vectors are indicated as a function of temperature $T_i$. In block 580, the vectors $\hat{A}(T_i)$ and $\hat{B}(T_i)$ are stored. Note that the vectors $\hat{A}(T_i)$ and $\hat{B}(T_i)$ are themselves collections of numeric values. The vectors or collections of numeric values may be stored in a memory, such as memory 180, for later retrieval using temperature as an index to the memory. In block 590, the temperature index i is compared to an integer m, where m is an integer that represents the number of temperatures used in testing. In some embodiments, temperatures $T_1, T_2, \ldots, T_m$ span an expected operating range of temperatures. If i is not equal to m, i is incremented in block 595, and the sequence of steps 520-580 is repeated. If i is equal to m, then the method ends.

After performing the method 500, a set of vectors are stored that relate various gate delay and wire delay characteristics to maximum operating frequency using equation (2) as a function of temperature T.

BEOL sensors may be needed only during an initial testing phase to determine an analytical model for resistance. In some embodiments, BEOL sensors are large and expensive relative to temperature sensors, and temperature sensors typically already exist on a die to provide inputs for thermal mitigation processes. Additionally, BEOL characteristics can be inferred from temperature measurements using analytical models. During operation of a chip, temperature measurements and FEOL measurements can be used, and BEOL characteristics can be inferred from temperature data and an analytical model for resistance, such as equation (1).

Figure 6:
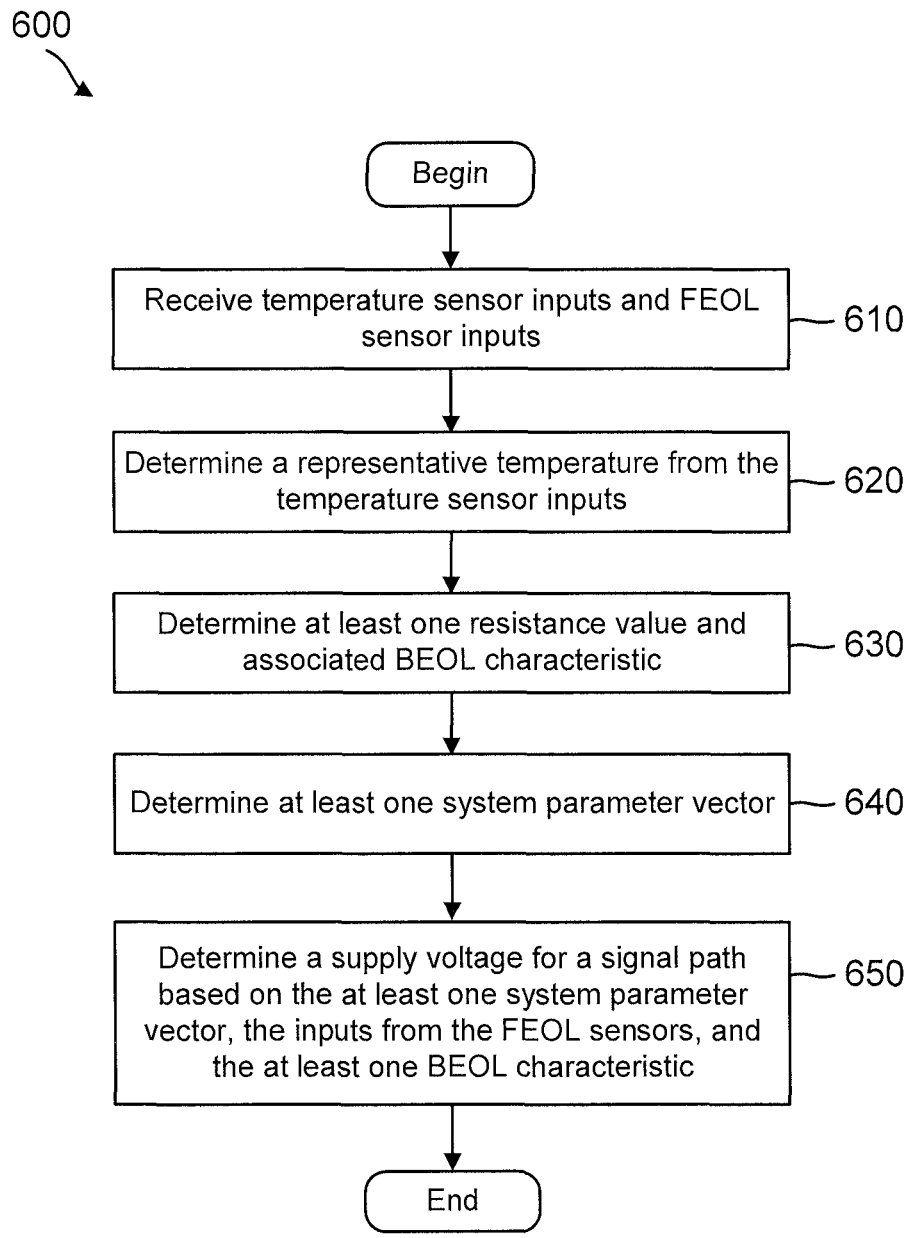
FIG. 6 is a flowchart illustrating an example method for determining a supply voltage of a signal path in a die in accordance with an embodiment of the disclosure.

FIG. 6 illustrates a flowchart of an example method 600 for determining a supply voltage of a signal path in a die, such as die 105, using inputs from various FEOL sensors and inferring BEOL delays from temperature measurements. The example method 600 begins in block 610. Method 600 is described with reference to system 100. In block 610, temperature sensor inputs and FEOL sensor inputs are received. The sensor inputs may be produced by temperature sensors, such as sensor 120, on a die, such as die 105, and the FEOL inputs may be produced by FEOL sensors, such as sensor 130, which may include ROs. In an embodiment, the temperature sensor inputs include values of temperature generated by the temperature sensors. The temperature sensor inputs and FEOL sensor inputs may be received by a PU, such as PU 170. The PU processes the inputs according to method 600 and generates a control signal output that is communicated to a voltage supply, such as voltage supply 190. In this manner, method 600 is performed during operation of the die to establish supply voltage.

Next in block 620 a representative temperature is determined from the temperature sensor inputs. If there is only one temperature sensor, then the representative temperature is a temperature measurement from the temperature sensor. However, there may be a plurality of temperature sensors on a die. One difference between testing and operation is that the die is set to a uniform temperature during testing. However, during operation, different parts of the die may be at different temperatures (e.g., due to different levels of processing and therefore heat generation on different parts of the die). In some embodiments, a single temperature is used in order to look up the appropriate $\hat{A}$ and $\hat{B}$ from memory because these vectors are indexed by temperature. There are many ways to determine a single temperature from measurements from a plurality of temperature sensors—e.g., lowest temperature, highest temperature, mean temperature, median temperature, etc.

In block 630 the representative temperature is used to determine at least one resistance value using an analytical model for resistance, such as equation (1). The at least one resistance value is used to estimate a BEOL characteristic, such as interconnect delay affecting the signal path of interest. In block 640, at least one system parameter vector is determined. For example, vectors $\hat{A}$ and $\hat{B}$ are determined for the signal path of interest from a look-up table using the temperature as an index. As discussed previously, the look-up table may be stored in memory in the system 100, such as memory 180.

Next in block 650, a value of supply voltage for at least a portion of the die is computed. For example, one way to determine voltage is to compute predicted operating frequency, F(predicted), using equation (2) and compare to the measured operating frequency, F(measured). A goal is to provide some margin between F(predicted) and F(measured). If F(measured) is too close to, or is above, F(predicted) then the chip is at risk of failure and the voltage needs to be lowered until F(measured) is less than F(predicted) by a certain margin. One reason why a margin between F(predicted) and F(measured) is desired is because F(predicted) is the predicted maximum operating frequency beyond which the chip typically fails. The supply voltage may be computed in a PU, such as PU 170, and communicated to a voltage supply, such as voltage supply 190. The voltage supply may then adjust its supply voltage according to the determined value of supply voltage. For example, the voltage supply may generate a voltage that is equal to, approximately equal to, or within an implementation tolerance of the value of supply voltage.

Thus, supply voltage is determined analytically using FEOL sensor data, which specifies $\hat{P}$ in equation (2), and temperature sensor data, from which BEOL characteristics represented as $\hat{W}$ in equation (2) are inferred. The supply voltage and the corresponding operating frequency includes less operating margin than previous techniques with a reduced number of sensors due to accuracy of an analytical model that incorporates FEOL and BEOL characteristics. In some embodiments, a BEOL sensor is needed only during a testing phase to determine an analytical model for resistance, from which BEOL characteristics can be computed.

Different voltages may be computed for different paths of interest within a PU, in which case a supply voltage may be selected for the PU as a worst-case (or lowest) voltage, a mean voltage, etc. Alternatively, different portions of a die may have different supply voltages, and the different supply voltages can be computed and applied separately.

A number of measures for setting supply voltage in a device are disclosed herein. These measures provide for determining a supply voltage with reduced voltage margin to produce a desired operating frequency. The supply voltage is based on measures of gate delays and interconnect delays in a path of interest. Measures of interconnect delay are determined during operation of a die without use of sensors, such as BEOL sensors, to measure interconnect delay directly. An analytical model that relates temperature to interconnect delay can be used to estimate interconnect delays.

As those of some skill in this art will by now appreciate and depending on the particular application at hand, many modifications, substitutions and variations can be made in and to the materials, apparatus, configurations and methods of use of the devices of the present disclosure without departing from the spirit and scope thereof. In light of this, the scope of the present disclosure should not be limited to that of the particular embodiments illustrated and described herein, as they are merely by way of some examples thereof, but rather, should be fully commensurate with that of the claims appended hereafter and their functional equivalents.

What is claimed is:

1. A method of setting a supply voltage in a device, the method comprising:
   receiving a first plurality of inputs from a plurality of sensors that are representative of a gate delay of a signal path on the device;
   receiving a second plurality of inputs from a plurality of temperature sensors;
   estimating a plurality of interconnect delays for the signal path based on the second plurality of inputs; and
   determining a value of the supply voltage for the signal path based on the first plurality of inputs and the plurality of interconnect delays; the method further comprising:
   determining a representative temperature from the temperature sensor inputs; and retrieving a collection of parameter values from a memory based on the representative temperature, wherein the supply voltage is further based on the collection of parameter values, further wherein estimating an interconnect delay in the plurality of interconnect delays comprises:
determining a resistance value based on the second plurality of inputs; and
determining the interconnect delay based on the resistance value.

2. The method of claim 1, wherein the supply voltage is determined to provide a predicted operating frequency that is larger than a current operating frequency of the signal path by a predetermined margin.

3. The method of claim 1, wherein the collection of parameter values includes first parameter values for weighting the first plurality of inputs and second parameter values for weighting the plurality of interconnect delays.

4. The method of claim 1, further comprising adjusting the supply voltage according to the value of the supply voltage.

5. The method of claim 1, wherein the signal path is selected from among a plurality of signal paths on the device as having a largest path delay among the plurality of signal paths.

6. A system on chip (SoC) comprising:
a plurality of front-end-of-line (FEOL) sensors;
a plurality of temperature sensors;
a processing unit configured to:
receive inputs generated by the plurality of FEOL sensors;
receive a plurality of temperature values generated by the temperature sensors;
determine at least one back-end-of-line (BEOL) characteristic of the SoC from the temperature values; and
determine a supply voltage for a signal path on the SoC to achieve an operating frequency, wherein the supply voltage is based on the inputs from the FEOL sensors and the at least one BEOL characteristic;
the SOC further comprising:
a memory configured to store a plurality of parameter values, wherein the parameter values are indexed by temperature,
wherein the processing unit is further configured to:
determine a representative temperature from the temperature values; and
retrieve a collection of parameter values from the plurality of parameter values in the memory based on the representative temperature, and
wherein determining the supply voltage is further based on the collection of parameter values and wherein determining at least one BEOL characteristic comprises:
determining at least one resistance value based on the temperature values; and
determining the at least one BEOL characteristic based on the at least one resistance value.

7. The SoC of claim 6, wherein the processing unit is further configured to determine the supply voltage to provide a predicted operating frequency that is larger than a current operating frequency of the signal path by a predetermined margin.

8. The SoC of claim 6, wherein the predicted operating frequency is a linear combination of the FEOL inputs and the at least one BEOL characteristic weighted by the collection of parameter values.

9. The SoC of claim 6, wherein the FEOL sensors and the temperature sensors are uniformly distributed on a portion of the SoC.

10. The SoC of claim 6, wherein the processing unit is further configured to determine the representative temperature as minimum, a maximum, an average, or a median of the temperature values.

11. The SoC of claim 6, wherein the processing unit is coupled to a voltage supply and configured to communicate the determined supply voltage to the voltage supply.

12. The SoC of claim 6, wherein the processing unit is further configured to select the signal path from among a plurality of signal paths as having a largest path delay among the plurality of signal paths.

13. A device comprising:
at least one delay sensor that provides an indication of path delay due to logic circuit characteristics of the device;
at least one temperature sensor; and
a processing unit configured to:
receive inputs from the at least one delay sensor and the at least one temperature sensor;
determine at least one resistance based on the inputs from the at least one temperature sensor;
determine at least one interconnect delay based on the at least one resistance; and
determine a supply voltage for a signal path on the device based on the at least one interconnect delay and the inputs from the at least one delay sensor, the device further comprising:
a memory configured to store a plurality of parameter vectors, wherein the processing unit is further configured to:
determine a representative temperature from the inputs from the at least one temperature sensor; and
retrieve at least one parameter vector from the memory based on the representative temperature, and wherein the supply voltage is further based on the at least one parameter vector.

14. The device of claim 13, further comprising a voltage supply coupled to the processing unit, wherein a voltage supplied by the voltage supply is based on the determined supply voltage.

15. The device of claim 14, wherein the processing unit is further configured to receive a measured operating frequency of the signal path, and wherein determining the supply voltage comprises:
determining a predicted operating frequency by using the at least one parameter vector to linearly combine the at least one interconnect delay and the inputs from the at least one delay sensor; and
determining that the predicted operating frequency is within a margin of the measured operating frequency, and based on this determination, determining the supply voltage as a smaller value than a current supply voltage.

16. The device of claim 14, wherein the processing unit is further configured to determine the supply voltage to provide a predicted operating frequency that is larger than a current operating frequency of the signal path by a predetermined margin.

17. The device of claim 16, wherein the predicted operating frequency is a linear combination of the inputs from the at least one delay sensor and the at least one interconnect delay weighted by the at least one parameter vector.

18. The device of claim 13, wherein the representative temperature is a combination of the temperature sensor inputs.

19. The device of claim 13, wherein the representative temperature is a minimum, a maximum, an average, or a median of the temperature sensor inputs.

20. The device of claim 13, further comprising at least one additional signal path, wherein the signal path is selected from among all the signal paths as having a largest path delay at the representative temperature among all the signal paths.

* * * * *